(12) United States Patent
McCannel et al.

(10) Patent No.: US 6,964,810 B2
(45) Date of Patent: Nov. 15, 2005

(54) MAGNETICALLY READABLE CARD AND A METHOD OF MAKING A MAGNETICALLY READABLE CARD

(75) Inventors: Duncan McCannel, Eagan, MN (US); Daniel A. Eke, Andover, MN (US)

(73) Assignee: Taylor Corporation, North Mankato, MN (US)

( * ) Notice: Subject to any disclaimer, the term of this patent is extended or adjusted under 35 U.S.C. 154(b) by 0 days.

(21) Appl. No.: 10/235,362

(22) Filed: Sep. 5, 2002

(65) Prior Publication Data

US 2003/0010820 A1 Jan. 16, 2003

Related U.S. Application Data (62) Division of application No. 09/311,031, filed on May 13, 1999, now Pat. No. 6,481,994.

(51) Int. Cl.⁷ ................................................. G11B 5/84
(52) U.S. Cl. ............. 428/323; 428/694 B; 428/694 SL; 283/82; 235/493
(58) Field of Search .......................... 428/694 SL, 141, 428/480, 694 B; 235/449, 450, 493; 283/82; 360/2

(56) References Cited

U.S. PATENT DOCUMENTS

| | | | |
|---|---|---|---|
| 3,308,010 A | * | 3/1967 | Engelhardt et al. ......... 428/480 |
| 3,477,126 A | | 11/1969 | Price |
| 3,746,606 A | | 7/1973 | Chao |
| 4,149,925 A | | 4/1979 | Mintz |
| 4,222,517 A | | 9/1980 | Richardson |
| 4,231,828 A | | 11/1980 | Mintz |
| 4,425,182 A | | 1/1984 | Jones et al. |
| 4,500,387 A | | 2/1985 | Embury |
| 4,708,761 A | | 11/1987 | Taniguchi et al. |
| 4,829,288 A | | 5/1989 | Eisenbeis |
| 4,859,259 A | | 8/1989 | Scheibner |
| 5,073,221 A | | 12/1991 | Waitts et al. |
| 5,182,062 A | | 1/1993 | Lee et al. |
| 5,215,874 A | * | 6/1993 | Sakakibara ................. 430/496 |
| 5,631,039 A | | 5/1997 | Knight et al. |
| 6,053,406 A | * | 4/2000 | Litman ....................... 235/449 |
| 6,273,984 B1 | * | 8/2001 | Bourdelais et al. .... 156/244.22 |
| 6,372,338 B1 | * | 4/2002 | Jeffers et al. ............... 428/329 |
| 6,481,994 B1 | | 11/2002 | McCannel et al. |

FOREIGN PATENT DOCUMENTS

JP 08-249651 * 9/1996

* cited by examiner

*Primary Examiner*—Stevan A. Resan
(74) *Attorney, Agent, or Firm*—Merchant & Gould P.C.

(57) ABSTRACT

The present invention includes a process for making a magnetically readable card. The process includes providing a polymeric extrudable substrate material and one or more magnetic strips. The substrate is extruded in an extruder. The magnetic strips are aligned and coextruded with the polymeric substrate in the extruder to form a continuous length of magnetic strips and polymeric material.

21 Claims, 8 Drawing Sheets

MAGNETICALLY READABLE CARD AND A METHOD OF MAKING A MAGNETICALLY READABLE CARD

RELATED COPENDING APPLICATION(S)

The present disclosure is a divisional application of copending USSN 09/311,031, entitled "Apparatus for Making a Magnetically Readable Card" now U.S. Pat. No. 6,481,994, and is related to a second divisional application USSN 10/368,067, entitled "Magnetically Readable Card and Method of Making a Magnetically Readable Card" filed Sep. 5, 2002.

BACKGROUND OF THE INVENTION

The present invention relates to a magnetically readable card and to a method for making the magnetically readable card as well as to an apparatus for making the magnetically readable card.

Magnetically readable cards typically comprise a polymeric sheet and a magnetic strip which is adhered to the polymeric sheet. Magnetic strips are applied to the polymeric sheet by incorporating the strips in a cover sheet and laminating the cover sheet onto a core stock sheet and then severing the laminated assembly into individual cards.

Magnetically readable cards have use as credit cards, bank cash machine cards, security passes, phone cards, hotel keys, and so on. These cards are typically constructed of a heavy, rigid vinyl polymer core with a thin vinyl polymer cover sheet or laminate bonded to opposite faces of the core. The cards may also be constructed of polystyrene and may be made of other polymeric extruded or calendered polymeric sheet substrate such as PETG, RPET, and APET. In addition to lamination to the surface of a core, cards can be used without any lamination which are called surface print cards.

The core is frequently printed. The cover sheets are transparent to allow readability of the printed material. The cover sheets are typically bonded to the core by application of both heat and pressure. To permit encoding of information on the card, the magnetically readable card includes a magnetic strip at or near the surface of the card. The magnetic strip incorporates a ferromagnetic powder such as an iron oxide and a binder including polymers such as vinyls. To provide satisfactory interaction with magnetic reading and writing equipment, the magnetic strip and the surrounding surfaces of the card should be precisely flat and free of defects. For some embodiments, however, the magnetic strip is applied with pressure sensitive to the surface of the card. The magnetic strip is raised above the surface of the card by the thickness of the strip and adhesive layer and is regarded as acceptable. Moreover, the magnetic strip should be precisely flush with the adjacent surfaces of the card and should have a uniform thickness and straight edges. The magnetic strip also must be securely bonded to the remainder of the card.

Magnetic material has typically been formed into a thin layer on a carrier layer such as a polyester sheet by a solvent coating process. The carrier sheet typically is a polyester-based polymer, such as polyethylene terephthalate, "PET." The PET can withstand solvents used in the coating process. The formation produces a laminate which is provided with a meltable release layer disposed between the magnetic layer and the carrier layer with a heat-active adhesive directly overlying the magnetic layer. The laminate can be slit into continuous strips or tapes. The magnetic layer can be transferred from the carrier layer directly to the card by placing the strip or tape on the card so that the adhesive layer faces the card, and then applying heat and pressure through the carrier layer to melt the release layer and activate the adhesive, thereby bonding the magnetic layer to the card. The carrier layer is stripped off of the magnetic layer at this point.

In U.S. Pat. Nos. 4,149,925 and 4,231,828, magnetic material is transferred from a carrier directly to individual cards by feeding each card with a strip of the laminate superimposed thereon through a nip defined by a heated roller and a reaction roller. The carrier sheet of the laminate contacts the heated roller whereas the adhesive layer of the laminate contacts the card. Heat transferred through the carrier layer activates the adhesive layer and melts the release layer so that the magnetic material separates from its carrier layer and bonds to the card. The card as fed into the nip must include a stiff core in order to withstand heat and pressure without unacceptable distortion. With this method, handling individual cards tends to be a slow and expensive process.

Another process described in U.S. Pat. No. 5,073,221 produces a plurality of magnetically readable cards in a single production cycle. With this process, a core stock is provided as a large sheet having printed regions corresponding to a multiplicity of cards arranged in a matrix of several rows and columns across the face of the sheet with waste or "gutter" spaces between those regions corresponding to individual cards. Cover sheets or over-laminae are superimposed on the core stock and attached thereto only at an edge thereof. A plurality of strips or tapes of the aforementioned laminae are unwound from individual reels and laid onto one cover sheet so that each strip or tape lies in registration with the individual printed card regions. The magnetic material in each strip or tape is "tacked" or bonded to the cover sheet by localized application of heat and pressure at only those locations corresponding to the waste or gutter spaces between the printed card regions on the sheet of the core stock. The carrier layer of each strip or tape is removed, leaving the magnetic material closely attached to the cover sheet.

In another embodiment, polymeric sheets are fed into a machine whereby one or multiple rolls of the magnetic strip material with heat activated adhesive on the back of the strip are aligned and applied to the sheet using a heat transfer method. A heated roller applies pressure to the magnetic strip material against the polymeric material whereby activating the heat activated adhesive and adhering it to the polymeric material.

In one other embodiment, polymeric sheets are fed into a machine whereby one or multiple rolls of the magnetic strips with pressure sensitive adhesive on the back of each strip is aligned and applied to the sheet. The pressure sensitive adhesive liner is removed from the magnetic strip to expose adhesive as a roller applies pressure to the magnetic strip material against the polymeric material, thereby adhering it to the polymeric material.

The entire composite is then placed between a pair of heated platens and subjected to heat and pressure so as to bond the cover sheets to the core stock and fuse the magnetic material with the adjacent cover sheet. Following the lamination step, individual cards are severed from the sheet of the core stock by die cutting. A preliminary tacking step may cause some distortion of the over-laminae or underlying core stock and therefore some unevenness in the resulting magnetic layer. The distortion and unevenness is confined to the waste or "gutter" areas of the sheets. The distorted regions, therefore, do not appear in the finished cards after the die-cutting operation.

This fabrication technique requires complex equipment and procedures. The tacking equipment must be discontinuous to limit distortion of the over-laminae to the waste areas of the sheet. The discontinuous process of unwinding only a limited length of each strip or tape and laying some onto a subassembly of cover layers and sheet of core stock of limited length is slow and troublesome. The original sheet of core stock must necessarily include waste areas to provide locations for tacking. Therefore, this process results in waste of materials. The composite, after the preliminary tacking step, is relatively fragile and poses considerable handling difficulties.

SUMMARY OF THE INVENTION

One embodiment of the present invention includes a process for making a magnetically readable card. The process comprises providing a polymeric, extrudable substrate material and providing one or more magnetic strips. The substrate material is extruded in an extruder. The magnetic strips are aligned and are applied to the extruded plastic after the plastic is extruded but before they enter the roll stack to form a continuous length of polymeric substrate web and one or more magnetic strips adhered thereto. The magnetic strips are aligned and are coextruded with the polymeric substrate in the extruder to form a continuous length of the polymeric substrate and one or more magnetic strips adhered thereto.

One embodiment of the method includes applying a magnetic strip on a sheet calendering line. Sheet vinyl and polyethylene are calendered or extruded.

Another embodiment of the present invention includes an apparatus for coextruding one or more magnetic strips with a polymeric substrate. The apparatus comprises an alignment mechanism for aligning a magnetic strip. The alignment mechanism comprises a plate and one or more guides positioned on the plate for receipt of the magnetic strip. The guides are set to apply a minimal tension to the magnetic strip while providing alignment of the strip. The plate is of a symmetry that aids in feeding the magnetic strip to the extruder. One embodiment of the apparatus further includes an extruded plastic (polymeric) web feed guide for receipt of the magnetic strip(s) onto the web of plastic from the extruder.

One other embodiment of the present invention includes a magnetically readable card. The card comprises a polymeric substrate and a magnetic strip attached to the substrate. The attachment occurs through chemical and physical and/or mechanical bonds created by coextrusion of the magnetic strip and the substrate.

Another embodiment of the present invention includes a continuous strip that comprises a polymeric substrate and one or more magnetic strips adhered to the substrate. The strips are adhered by physical and chemical and/or mechanical bonds formed during coextrusion of each of the magnetic strips and the substrate rather than by an adhesive separately applied.

DESCRIPTION

Figure 1:
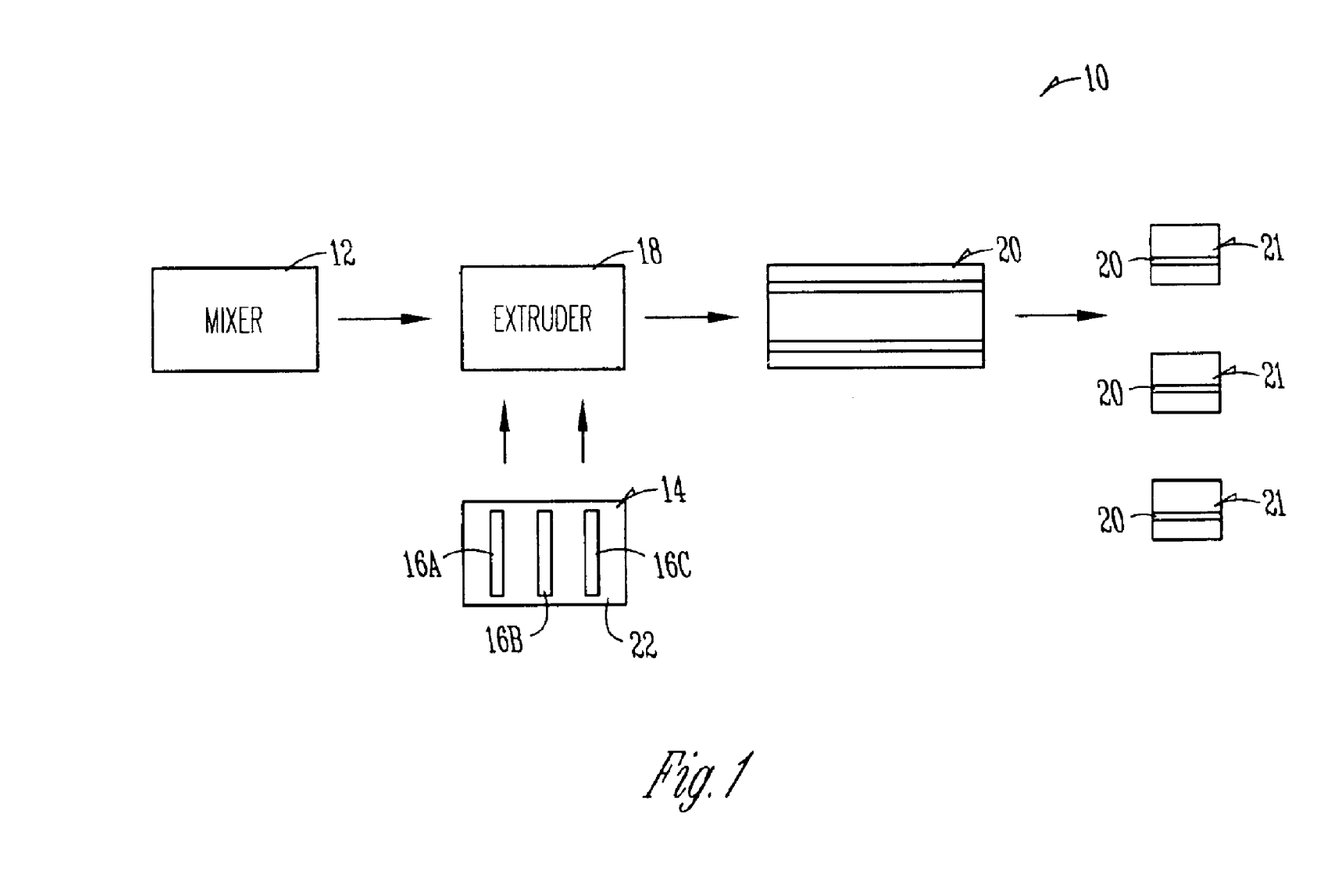
FIG. 1 is a schematic view of one embodiment of the process for making a magnetically readable card of the present invention.

A process of the present invention illustrated schematically at 10 in FIG. 1 comprises a mixing operation 12, performed to mix a polymeric substrate, a magnetic strip alignment operation 14, performed to align a plurality of magnetic strips 16A, 16B and 16C, an extrusion operation 18 for co-extrusion of the polymeric substrate and the plurality of magnetic strips 16A, 16B and 16C in order to form a continuous web 20 and, ultimately, a magnetically readable card 21 from a continuous extruded substrate and magnetic strip web 20.

The process of the present invention is a continuous co-extrusion process that substantially streamlines more conventional processes of fabricating magnetically readable cards. Conventional processes tend to be batch-based processes which employ discrete sections of a polymeric substrate and which attach a magnetic strip to the discrete substrate. This type of batch-based process is not only time consuming and labor intensive but produces wasted materials because of misalignment of the strip on the substrate.

Batch-based processes have predominated because of a problem with curling of a magnetically readable card fabricated by a continuous process. The method of the present invention substantially eliminates the curling problem by minimizing tension applied to the magnetic strips prior to feeding the strips to an extruder and co-extruding the magnetic strips with the substrate in order to "match" tension of the magnetic strips to compression/expansion stress in the extruded substrate.

In the process of the present invention, a plurality of magnetic strips such as are shown at 16A, B and C in FIG. 1 are coextruded with a polymeric substrate of infinite length in order to make a continuous strip with polymeric substrate with the magnetic strips 16A, B, C attached in a desired alignment without substantial curling as is shown at 20.

The continuous strip 20 may then be cut to make individual magnetically readable cards 21. The cards 21 may be printed subsequent to the extrusion process 18. The cards 21 may be encoded.

The continuously formed polymeric substrate 22 is comprised of a material such as polyethylene or polyethylene terephthalate, PET. For one embodiment of the magnetically readable card, the polymeric substrate 22 is extruded to form a continuous sheet having a thickness of about 0.024 inches.

The substrate 22 is extruded and treated to have a matte finish over a surface 24 that receives the magnetic strip 16. The substrate 22 is extruded and treated to have a gloss finish over a surface which opposes the magnetic strip-bearing surface 24. This surface may have a matte finish between magnetic strips.

The surface tension of the extruded substrate is about 36 dynes prior to any treatment such as a corona treatment. It is preferred that the continuous extruded substrate be free of any curvature. It is believed that the presence of a curvature results from an excess of tension, as compared to the substrate, in one or more of the continuous magnetic strip feeds as the feed is fed into the extruder 18.

The magnetic strips 16A, 16B, and 16C are typically comprised of particles of a magnetic material such as iron oxide or barium ferrite that are suspended in a polymeric matrix such as polyethylene or other organic polymer and are formed or extruded as a tape or strip. The magnetic tape or strip 16 is coextruded with the substrate 22 in order to make the magnetic card 21 of the present invention.

One type of magnetic strip 16 is an iron oxide-loaded PVC product which is manufactured by Leon Plastics. This product is a high density product. The PVC or polyethylene matrix has a density of one gram per cubic centimeter.

A second magnetic composite comprises a flexible magnetic rubber strip product which is manufactured by 3M Corporation of St. Paul, Minn. This magnetic strip product utilizes barium ferrite which is magnetically similar to the iron oxides in remanent magnetization, but has higher coercivities. Other types of strip-based magnetic products manufactured by 3M or other companies in which magnetic particles are mixed with either polypropylene or nylon may be suitable for use in the process and product of the present invention.

Figure 2:
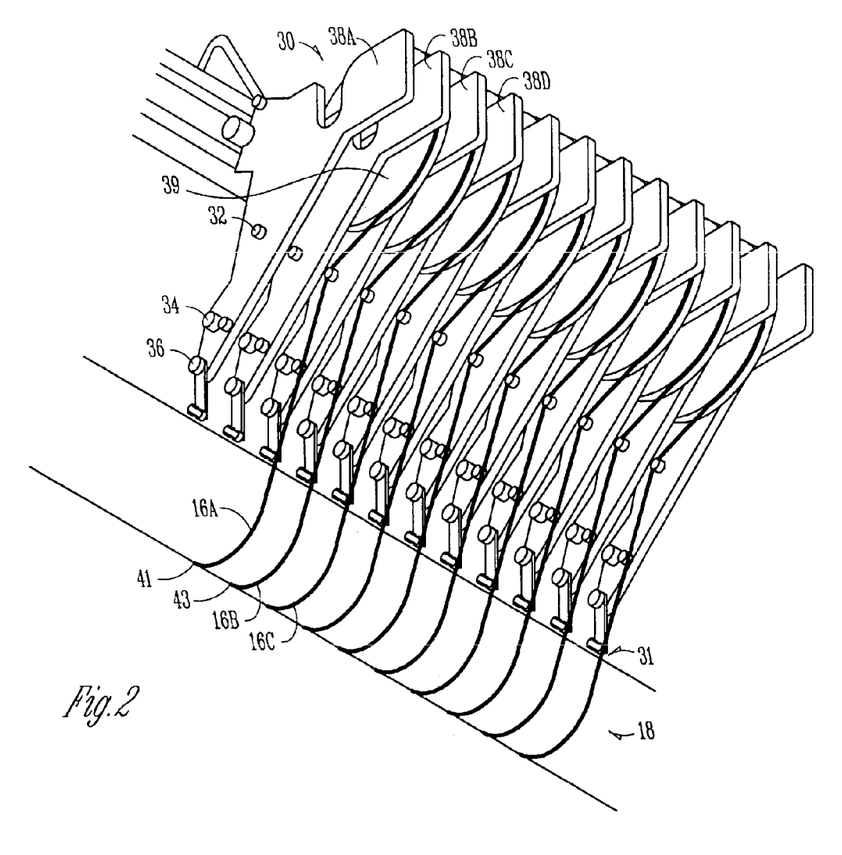
FIG. 2 is a perspective view of one embodiment of an alignment device for aligning a magnetic strip component of the magnetically readable card of the present invention.
Figure 8:
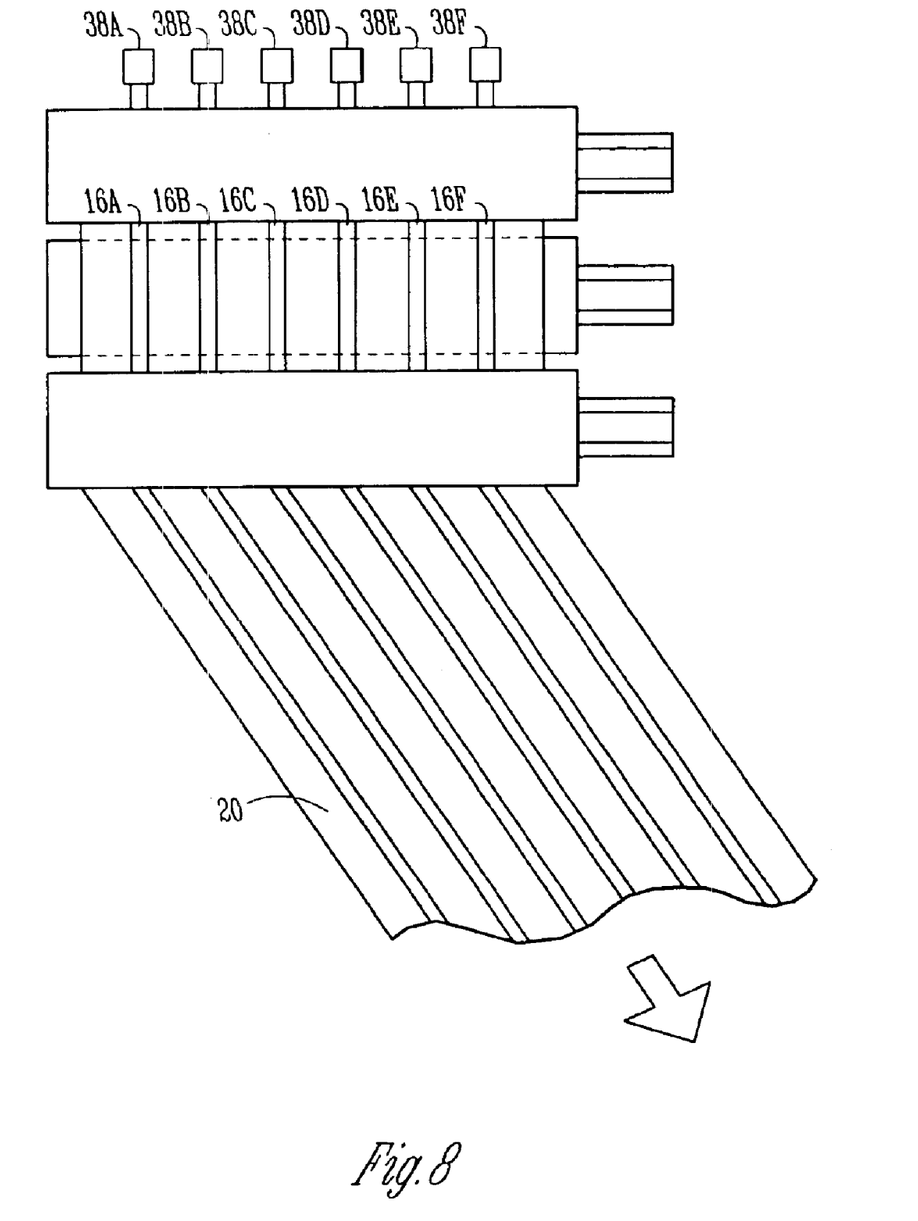
FIG. 8 is a schematic view illustrating the spacial relation of the magnetic strips to the extruded plastic.
Figure 10:
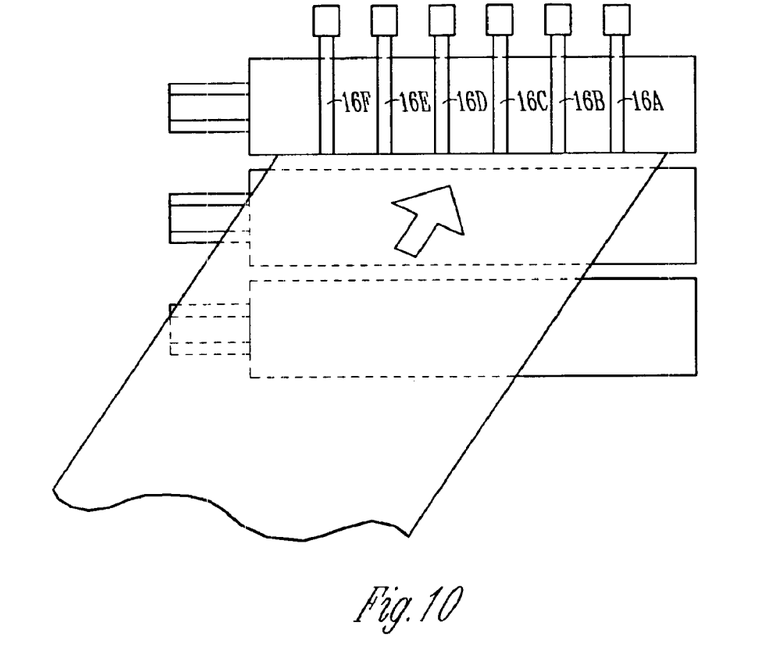
FIG. 10 is a side view from an extruder side of the roll stack.
Figure 11:
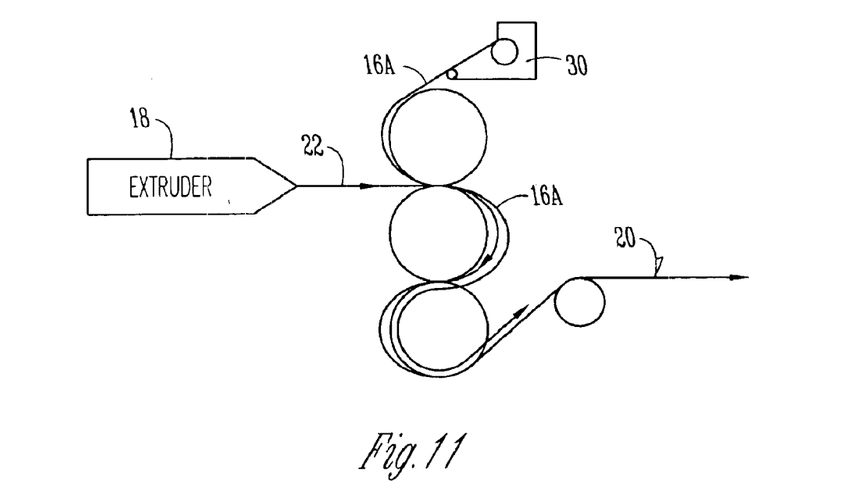
FIG. 11 is a side view of an extrusion line roll stack.

With the process of the present invention, strips of magnetic tape 16A, 16B and 16C are aligned with a tape-alignment device such as is shown at 30 in FIG. 2. The device 30 is positioned adjacent an extruder well 31 so that individual magnetic strips 16A, 16B, and 16C, are attached to the extruder 18 at the extruder well 31. The alignment device 30 comprises a plurality of guides such as are shown at 32, 34, and 36 that are arranged on a plate 38 in FIG. 2. A roll 39 of magnetic tape is also positioned on the plate 38. A relation of the guideplates 38A, 38B, 38C, 38E and 38F of the alignment mechanism 30 to the extruder is shown in various views in FIGS. 8, 10 and 11.

The plate 38 is of a shape that aligns the magnetic strip 16A or 16B or 16C prior to being fed into the extruder 18. In order to initiate feed of the magnetic strips 16 into the extruder 18, all that is required is to expose a loose end 41 or 43 of the strip 16A or 16B or 16C to a flow of plastic or polymeric material within the extruder. Momentum of the polymer flow within the extruder guides and produces continuous movement of the magnetic strips 16A, 16B, and 16C into the extruder.

Figure 2A:
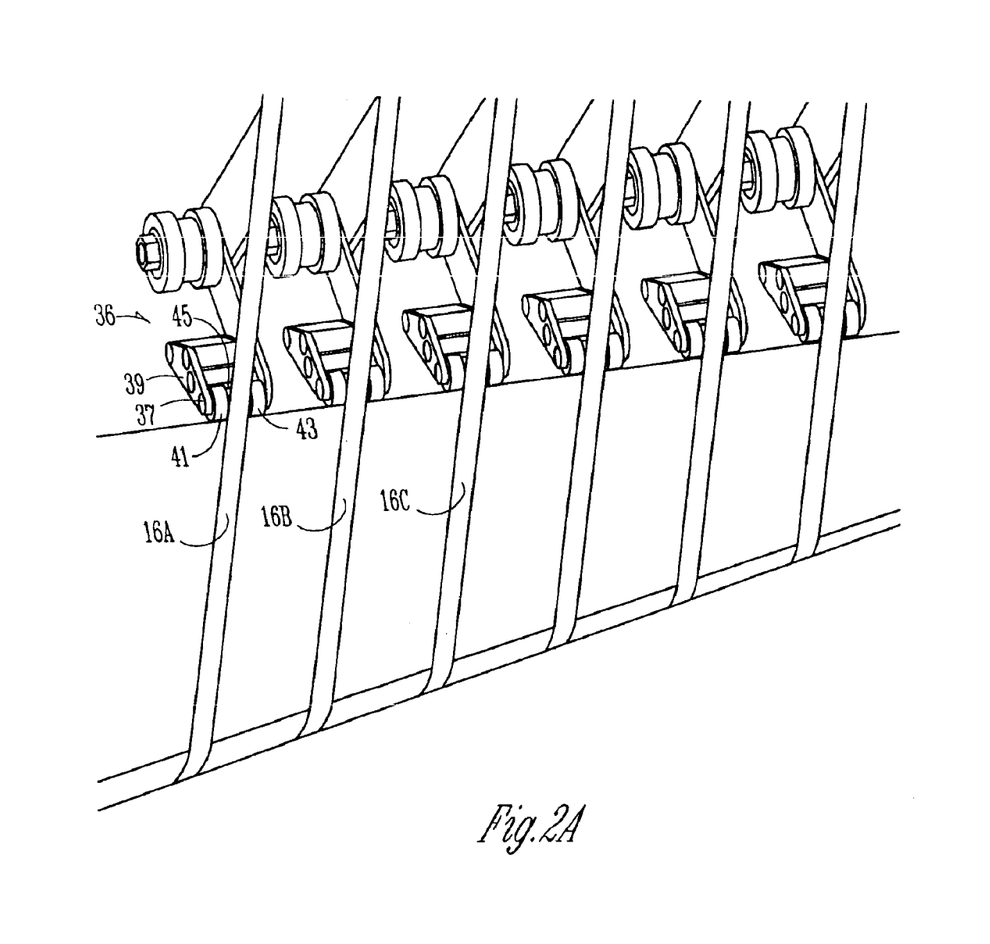
FIG. 2A is a perspective view of the alignment device of FIG. 2 which features guide components.
Figure 3:
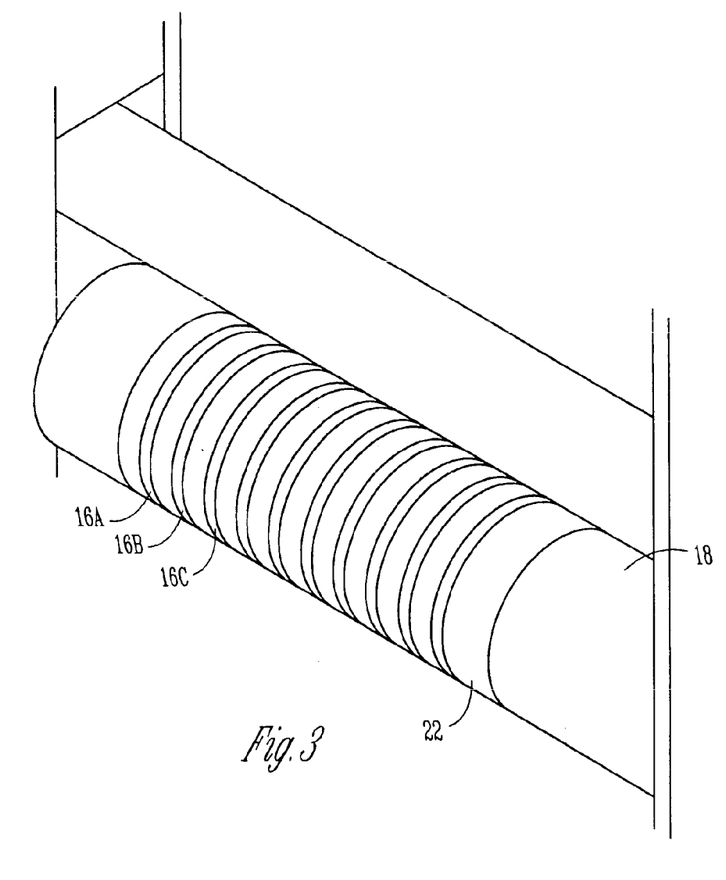
FIG. 3 is a perspective view of one embodiment of the coextrusion of polymeric film and magnetic strip to make the magnetically readable card of the present invention.
Figure 4:
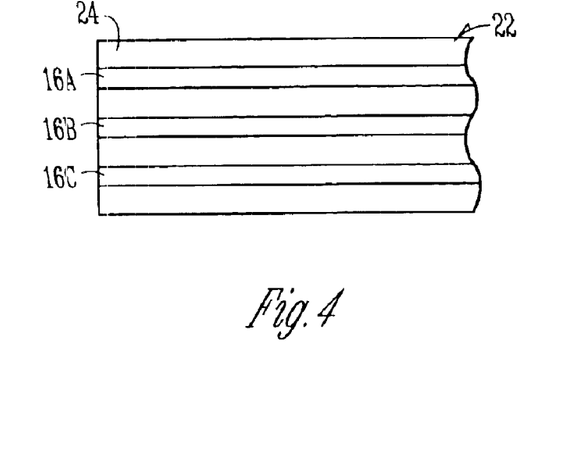
FIG. 4 is a top plan view of one embodiment of a coextrusion of magnetic strips and a polymeric substrate.
Figure 5:
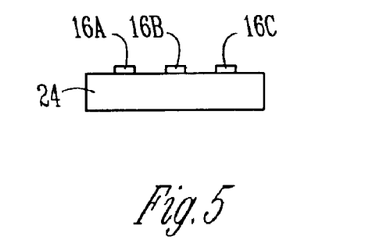
FIG. 5 is a cross-sectional view of one embodiment of an uncut plurality of magnetically readable cards.
Figure 6:
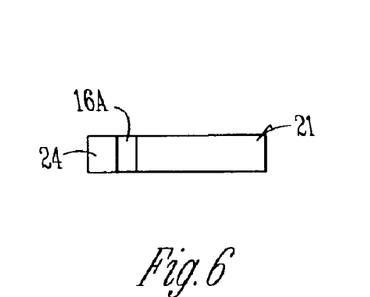
FIG. 6 is a top plan view of one embodiment of one side of the magnetically readable card.
Figure 7:
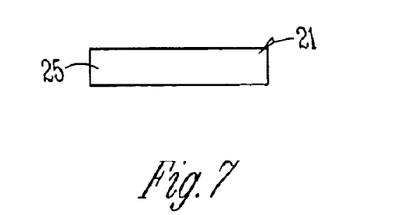
FIG. 7 is a top plan view of an opposing side of the magnetically readable card of FIG. 6.
Figure 9:
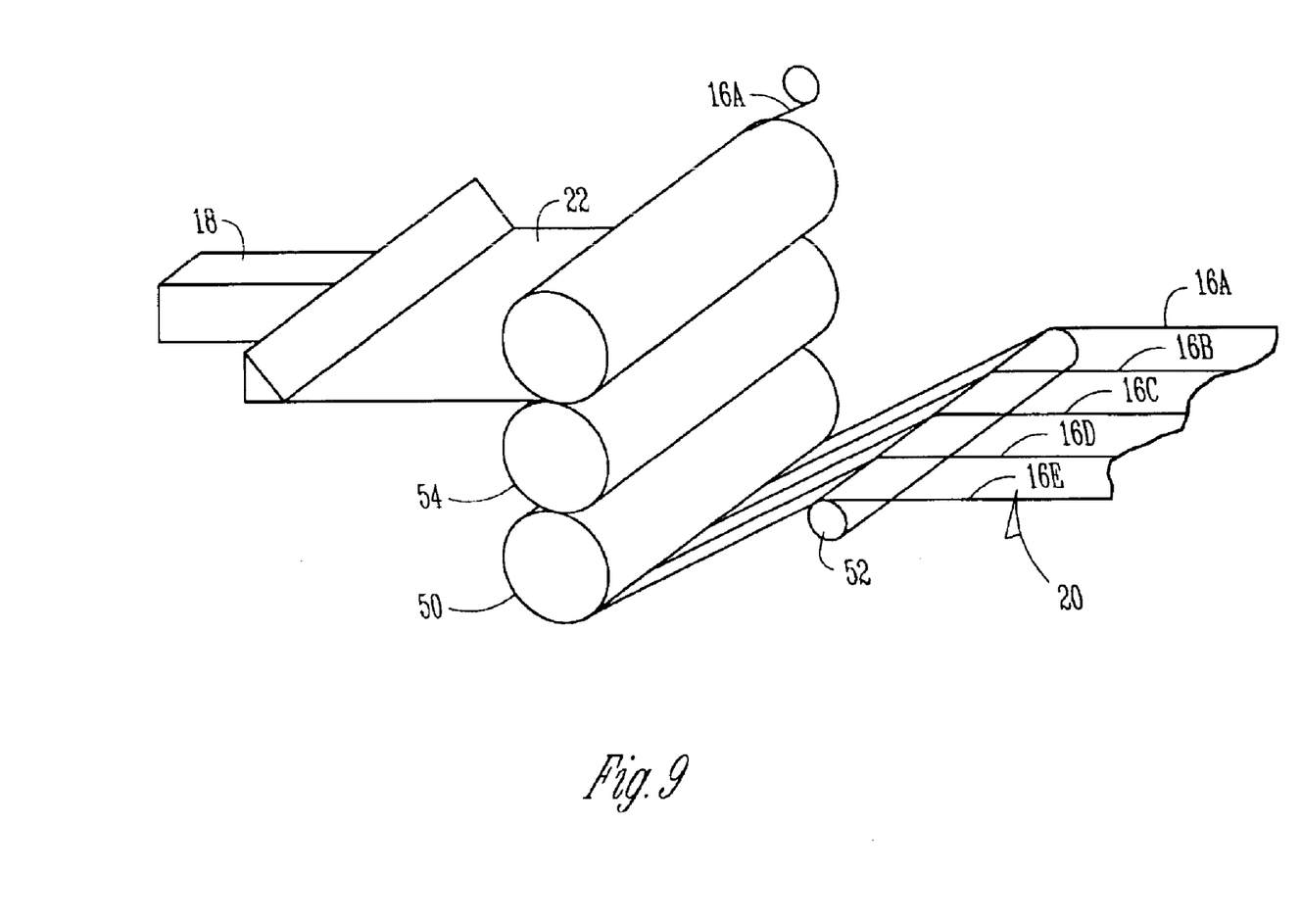
FIG. 9 is a perspective view of an extruder and roll stack used to make the magnetically readable card of the present invention.

Ideally, tension on the magnetic strips 16A, 16B, and 16C is kept to a minimum by the tape-alignment device 30. Excessive tension on the magnetic strips 16A, 16B and 16C results in a curl in the final extruded product which is undesirable. Consequently, the device 30 does not include any tensioning rollers, but only alignment rollers such as 50, 52 and 54 in FIG. 9. The guide 36 includes a roll 37, shown in FIG. 2A, that moves radially about an axis 39. The roll 37 includes platens 41 and 43 that define a guidepath 45 sized to receive the magnetic strip such as 16A or 16B or 16C.

It has been found that in order to make a magnetically readable card having a thickness of about 0.024 inches, process conditions described in Table 1 were utilized.

TABLE 1

| magnetic strip feed rate | 32 feet per minute |
| extrusion melt temperature | 465° F. melt temperature |
| temperature profile | 205° top roll, 185° center roll, 182° bottom roll |

In one embodiment, the alignment device 30 includes alignment rollers such as 32, 34, 36, 37, 41, 43 and 45 that are ground and hardened in order to more precisely align the magnetic strips 16A, 16B and 16C. The tip rollers are ground and polished with vernier adjustments for final positioning of magnetic strips into the roll stack. Air cylinders may be added to the device to provide a mechanism of tilting the device 30 for full integration of the magnetic strips 16A, 16B, and 16C into the extruder 18.

The magnetic strip location variation produced as a result of traversing the alignment device 30 is about 0.019 inches. The finished magnetically readable card may have some linear marks on the magnetic strip which are caused by tape rollers. These linear marks may be eliminated by utilizing ground or polished rollers. Surfaces of the ground or polished rollers have a reduced coefficient of friction. In one embodiment, the surface tension of each of the magnetic strips 16A, 16B and 16C is about 36 dynes without corona treatment of the composite strip substrate such as is shown at 20.

Once a continuous strip of polymeric material 22 with magnetic strips 16A, 16B and 16C was formed, the continuous strip 22 was cut to form magnetically readable cards of a desired size. In one embodiment, prior to cutting, the continuous sheet was printed. In embodiments where card printing occurred, the best results were achieved when the printed sheets were corona treated. Corona treatment was performed with a conventional generator, transformer and treater. The treater is comprised of a capacitor with the plastic material to be treated placed between the electrodes. It has been found that a ceramic tube style corona treater provides good corona treatment for the readable cards of the present invention. It was found that sheets which were not corona treated but printed, displayed an inferior ink adhesion as compared to corona-treated sheets which were then printed.

Cards which were printed and cut were then encoded using conventional encoding methods.

Cards of various conditions were tested following processes of coextrusion, printing, cutting and encoding. The results indicated that cards which were cut as extruded, without printing or without corona treatment, generally had good encoding and met appropriate industry standards. Cards which were cut and printed, but had no corona treatment on the back side, had good encoding and met industry standards. Cards which were printed and corona treated had good encoding and met industry standards. Cards which were varnished on the magnetic side and corona treated would not encode. It is believed that the magnetic area must be masked during the varnishing process in order to permit the magnetic strip to be encoded.

While the invention has been disclosed by reference to the details of preferred embodiments, this disclosure is intended in an illustrative rather than a limiting sense, as it is contemplated that modifications will readily occur to those skilled in the art, within the spirit of the invention and the scope of the appended claims.

We claim:

1. A magnetically readable card comprising:
a continuously melt extruded polymeric substrate, and a magnetic strip attached to the extruded substrate by continuous coextrusion of the magnetic strip and the substrate through a roll stack, wherein the magnetic strip comprises a magnetic layer comprising magnetic particles in a polymer matrix, a tape carrier on the magnetic layer, and an adhesive layer between the tape carrier and the extruded substrate, and the card is substantially free of curl.

2. The magnetically readable card of claim 1 wherein the strip is free of an adhesive layer between the magnetic layer and the tape carrier.

3. The card of claim 1 wherein the polymeric substrate is printed.

4. The card of claim 1 wherein the polymeric substrate is varnished.

5. The card of claim 1 wherein the magnetic strip is encoded.

6. The card of claim 1 wherein the substrate comprises polyethylene, polystyrene or polyvinyl chloride.

7. The card of claim 1 wherein one surface of the card has a gloss finish.

8. The card of claim 1 wherein one surface of the card has a matte finish.

9. A continuous strip, comprising a continuously melt extruded polymeric substrate and a magnetic strip attached to the substrate by continuous joining of the magnetic strip and the substrate through a roll stack, wherein the magnetic strip comprises a magnetic layer comprising magnetic particles in a polymer matrix, a tape carrier on the magnetic layer, and the tape carrier contacts the extruded substrate.

10. The continuous strip of claim 9 wherein there resulting continuous strip is substantially free of curl.

11. The continuous strip of claim 9 wherein the magnetic strip is attached to the substrate free of adhesive.

12. The continuous strip of claim 9 wherein the tape carrier of the magnetic strip is attached to the substrate with an adhesive.

13. The continuous strip of claim 9 wherein there are from 1 to about 10 magnetic strips attached to the substrate.

14. A magnetically readable card prepared by a continuous process, the process comprising:
melt extruding a polymeric substrate;
combining, through a roll stack, the extruded substrate and a magnetic strip; and
cutting the combined substrate and magnetic strip into cards substantially free of curl and curvature, wherein the magnetic snip comprises a magnetic layer comprising magnetic particles in a polymer matrix, a tape carrier, and an adhesive between the tape carrier and the extruded substrate, and the magnetic strip reinforces the extruded substrate to provide a magnetic strip card with greater tensile strength compared to the magnetic strip of a magnetic card prepared by hot stamping.

15. The magnetically readable card of claim 14 wherein the magnetic strip of the card has greater dimensional stability compared to the magnetic strip of a magnetic card prepared by hot stamping.

16. The magnetically readable card of claim 14 wherein the magnetic strip of the card has greater durability compared to a magnetic card prepared by hot stamping.

17. The magnetically readable card of claim 14 wherein the tape carrier is a polyester.

18. The magnetically readable card of claim 14 wherein the tape carrier is embedded in the surface of the extruded substrate.

19. A continuous strip prepared by a continuous process, the process comprising:
melt extruding a polymeric substrate; and
combining, through a roll stack, the extruded polymeric substrate and a magnetic strip, wherein the magnetic strip comprises a magnetic layer comprising magnetic particles in a polymer matrix, a tape carrier adjacent to the magnetic layer, and an adhesive on the tape carrier which adhesive contacts the extruded substrate.

20. The magnetically readable card of claim 19 wherein the tape carrier is a polyester.

21. The magnetically readable card of claim 19 wherein the tape carrier is embedded in the surface of the extruded substrate.

* * * * *